United States Patent
Formenti

(10) Patent No.: US 8,125,189 B2
(45) Date of Patent: Feb. 28, 2012

(54) SYSTEMS FOR CHARGING A BATTERY IN A CLOSED LOOP CONFIGURATION

(75) Inventor: Jose Antonio Vieira Formenti, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 819 days.

(21) Appl. No.: 12/101,682

(22) Filed: Apr. 11, 2008

(65) Prior Publication Data
US 2008/0253053 A1 Oct. 16, 2008

Related U.S. Application Data

(63) Continuation of application No. 11/108,454, filed on Apr. 18, 2005, now abandoned.

(51) Int. Cl.
H02J 7/00 (2006.01)
H02J 7/16 (2006.01)
H02H 3/20 (2006.01)
H02H 9/08 (2006.01)

(52) U.S. Cl. ........ 320/134; 320/136; 320/138; 320/140; 361/90; 361/93.9

(58) Field of Classification Search .................. 320/106, 320/134, 135, 136, 132, 183, 163, 140, 31, 320/112, 114; 361/90, 103, 58, 93.8, 93.9
See application file for complete search history.

(56) References Cited

U.S. PATENT DOCUMENTS

| | | | | |
|---|---|---|---|---|
| 5,739,670 A * | 4/1998 | Brost et al. | | 320/131 |
| 5,945,811 A * | 8/1999 | Hasegawa et al. | | 320/141 |
| 6,208,117 B1 * | 3/2001 | Hibi | | 320/134 |
| 6,946,818 B2 * | 9/2005 | Cawthorne et al. | | 320/134 |
| 7,183,748 B1 * | 2/2007 | Unno et al. | | 320/136 |
| 7,501,794 B2 * | 3/2009 | Felder et al. | | 320/128 |
| 2001/0021092 A1 * | 9/2001 | Astala | | 361/90 |
| 2002/0021109 A1 * | 2/2002 | Marvin et al. | | 320/134 |
| 2003/0141848 A1 * | 7/2003 | Fujiwara | | 320/134 |
| 2004/0189259 A1 * | 9/2004 | Miura et al. | | 320/134 |
| 2005/0077878 A1 * | 4/2005 | Carrier et al. | | 320/134 |
| 2005/0212489 A1 * | 9/2005 | Denning et al. | | 320/134 |

* cited by examiner

*Primary Examiner* — Melissa Koval
*Assistant Examiner* — Alexis Boateng
(74) *Attorney, Agent, or Firm* — William B. Kempler; Wade J. Brady, III; Frederick J. Telecky, Jr.

(57) ABSTRACT

A system is provided for charging a battery with an AC adapter. The system includes a first closed loop electrical path between the battery and the AC adapter. The first closed loop electrical path includes a first monitoring circuit for monitoring at least one first parameter of the system and a control circuit for dynamically adjusting the AC adapter output to the battery in response to the at least one first parameter exceeding an associated predetermined threshold. The system includes a second closed loop electrical path between the battery and the AC adapter. The second closed loop electrical path includes a second monitoring circuit for monitoring at least one second parameter of the system and a protection circuit responsive to the at least one second parameter exceeding an associated predetermined threshold for protecting the system until the AC adapter reaches a predetermined value.

20 Claims, 2 Drawing Sheets

SYSTEMS FOR CHARGING A BATTERY IN A CLOSED LOOP CONFIGURATION

This is a continuation of application Ser. No. 11/108,454 filed Apr. 18, 2005, the entirety of which is incorporated herein by reference.

TECHNICAL FIELD

The invention relates in general to electronic circuitry. More particularly, it relates to systems for charging a battery in a closed loop configuration.

BACKGROUND

Many portable electronic devices known in the arts, such as portable computers, use chargers to replenish batteries when access to AC power is available. A common approach requires the use of an AC adapter, which converts the AC power to a fixed output DC voltage, and a charger function that is implemented in the end equipment. Generally, the approach commonly used in the arts requires a system where the charger function has a control function and a power conversion stage. The power stage down-converts the fixed AC adapter output DC voltage by means of either a linear stage or a switching mode converter. The control functions and the charger stage implement the battery charger function that executes the battery charging process.

The control functions monitor specific battery and system parameters such as (but not limited to) battery voltage and/or battery current, compares each of them to a reference value, and generates an error signal as needed, that is sent to the charger power stage. This error signal, in turn, adjusts the power stage duty cycle (in DC/DC conversion power stages) or the power stage pass element conductance (in linear power stages) in order to set the battery charge current or battery charge voltage to the desired value. Control functions that monitor distinct pack or system parameters other than the battery charge current or battery charge voltage may be added to the system, depending on the overall system requirements.

The approach for the interface between the control function and power stage generally known in the arts requires the inclusion of both the control function and the power stage in the end equipment, with the AC adapter output voltage being of a fixed value. As a result, in this approach the AC adapter output voltage is not dependent on the error signal generated by the control function. This approach results in many disadvantages in commonly used battery charger control topologies, including but not limited to the high cost of power stage elements such as inductors, filter capacitors and MOSFET switches in DC/DC power stage topologies, and linear pass elements (usually MOSFET switches) in linear power stage topologies. System efficiency suffers as a result of the conduction and/or switching losses in the power stage. Power dissipation in the end equipment is increased by converter stage power dissipation.

SUMMARY OF THE INVENTION

According to one aspect of the invention, a system for charging a battery with an AC adapter is provided. The system includes a first closed loop electrical path between the battery and the AC adapter. The first closed loop electrical path includes a first monitoring circuit for monitoring at least one first parameter of the system and a control circuit for dynamically adjusting the AC adapter output to the battery in response to the at least one first parameter exceeding an associated predetermined threshold. The system includes a second closed loop electrical path between the battery and the AC adapter. The second closed loop electrical path includes a second monitoring circuit for monitoring at least one second parameter of the system and a protection circuit responsive to the at least one second parameter exceeding an associated predetermined threshold for protecting the system until the AC adapter reaches a predetermined value.

BRIEF DESCRIPTION OF THE DRAWING

The present invention will be more clearly understood from consideration of the following detailed description and drawing in which.

DETAILED DESCRIPTION

Systems and methods are provided for configuring an AC voltage adapter with end equipment control loops in a closed loop topology to implement a battery charging system. According to the invention, the charger power stage is implemented in the AC adapter, while the control loops can be implemented in the end equipment.

Figure 1:
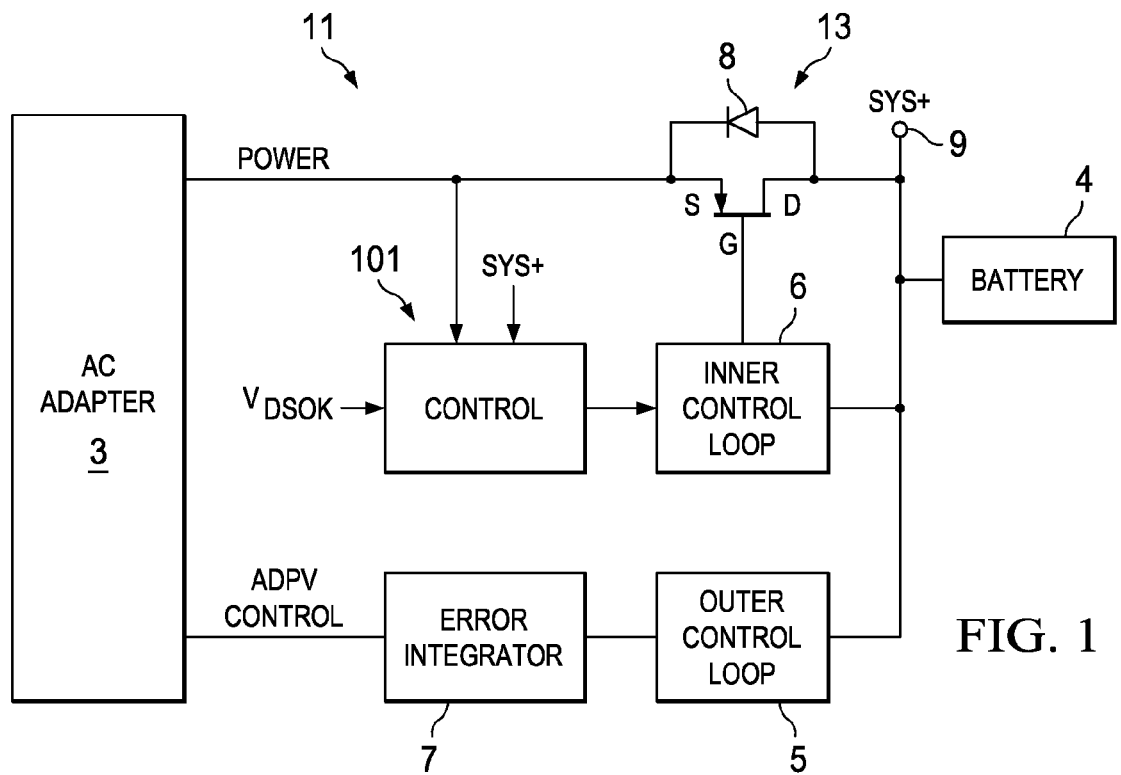
FIG. 1 is a simplified schematic circuit diagram of a system for charging a battery in accordance with an aspect of the invention.

FIG. 1 illustrates a system 11 for charging a battery in accordance with an aspect of the present invention. It should be understood that there are various alternative implementations that may be made without departure from the principles of the invention. The system 11 includes an AC adapter 3 that charges a battery pack 4. The system 11 further includes a control system 13 that comprises an outer control loop 5, an inner control loop 6, an error integrator 7, and a p-type power MOSFET switch 8 and a control logic circuit 101.

The outer control loop 5 is coupled between the AC adapter 3 and the battery pack 4. The outer control loop 5 monitors system or battery parameters and outputs an error signal. The error signal is representative of the difference between at least one first parameter and an associated predetermined threshold. The error signal is integrated by the error integrator 7 and then used to control the voltage output of the AC adapter 3 via an adapter voltage control input (ADPV). When the at least one first parameter exceeds the associated predetermined threshold, the adapter voltage control reduces the AC adapter output to the battery pack 4 by an amount based on the error signal. The error integrator block 7 also includes a compensation network to make the outer loop 5 stable under distinct operating conditions. In this system, the unity gain frequency for the loop 5 must be set to very low values (in the order of hundreds of hertz) to ensure stable operation when the adapter power stage is submitted to varying load conditions. As a result, the outer loop 5 will have a very slow response to system load transients.

In order to avoid undesired over-current transients when charging the battery and over-voltage transients at the system power bus 9 an additional, fast response or inner control protection loop 6 is added to the system. The inner control protection loop 6 is coupled between the battery pack 4 and the gate (G) of the MOSFET switch 8. The source (S) of the MOSFET switch 8 is coupled to the output of the AC adapter 12 and the drain (D) is coupled to the system power bus 9. The inner control loop 6 monitors the system or battery parameters and controls the resistance (Rdson) between the source and drain of the MOSFET switch 8 based on the monitored parameter or parameters. The inner control loop 6 outputs a signal representative of the difference between at least one second parameter and an associated predetermined threshold. If the at least one second parameter exceeds the associated predetermined threshold, the inner loop increases the Rdson to a predetermined value based on the signal to protect the battery 4 and system 11 until the outer control loop 5 corrects the AC adapter 3 to the desired operating point. The types of parameters include, but are not limited to, the charging current of the battery, the battery voltage, the adapter current, the adapter voltage, and the voltage at the system power bus 9.

When the transients are present, both the inner loop 6 and outer loop 5 are active. To guarantee proper system operation, the outer loop 5 is always active, and the inner loop 6 is inactive when the transient response phase is over. The inner and outer loops 6, 5 usually monitor the same system parameters during charging of the battery pack 4. The thresholds used by the inner and outer loops 6, 5 to generate the control signals are set to different values for each other to guarantee that the outer loop 5 sets the steady state adapter voltage when the inner loop 6 is inactive. If both the inner and outer loops 6, 5 are monitoring the same type of parameter to generate the control signals, the inner loop associated threshold corresponding to the at least one second parameter is set to a higher value than the outer loop associated threshold corresponding to the at least one first parameter. As an example, if both the inner and outer loops 6, 5 are monitoring the charge current, the inner loop threshold for the charge current should be set to a higher value (10-20% is an usual number) than the outer loop threshold for the charge current, so that in steady state the adapter voltage will be set to the lower value required to adequately charge the battery pack 4 and supply the system load. Generally, the difference between the thresholds is between 10 to 20% of the value of the outer loop threshold for the charge current. Similarly, if both the inner and outer loops 6, 5 are monitoring the system voltage, the inner loop threshold for the outer loop should be set higher (usually a few mV) than the outer loop threshold for the system voltage. Note that in both cases the thresholds selected for the inner loop 5 set the pack charge current and pack charge voltage, which is equal to the system voltage in steady state.

When the adapter 3 is powered but not yet connected to the system 13, the adapter voltage defaults to the adapter open loop voltage, which is usually defined by a voltage clamp internal to the adapter circuit. Activating the inner loop 6 under those conditions can lead to excessive power dissipation on the power MOSFET switch 8, since the inner control loop increases resistance (Rdson) between the source (S) and the drain (D) of the power MOSFET switch 8 to regulate the pack charge current and system voltage to the values defined by the inner loop internal thresholds. To avoid this problem, a control circuit 101 turns off the power MOSFET switch 8 until the adapter voltage is above the system voltage by a value smaller than an internal threshold (VDSOK). The outer control loop 5 monitors the power to system 9 voltage differential and reduces the adapter voltage until it reaches the internal threshold VDSOK of the control circuit 101.

Figure 2:
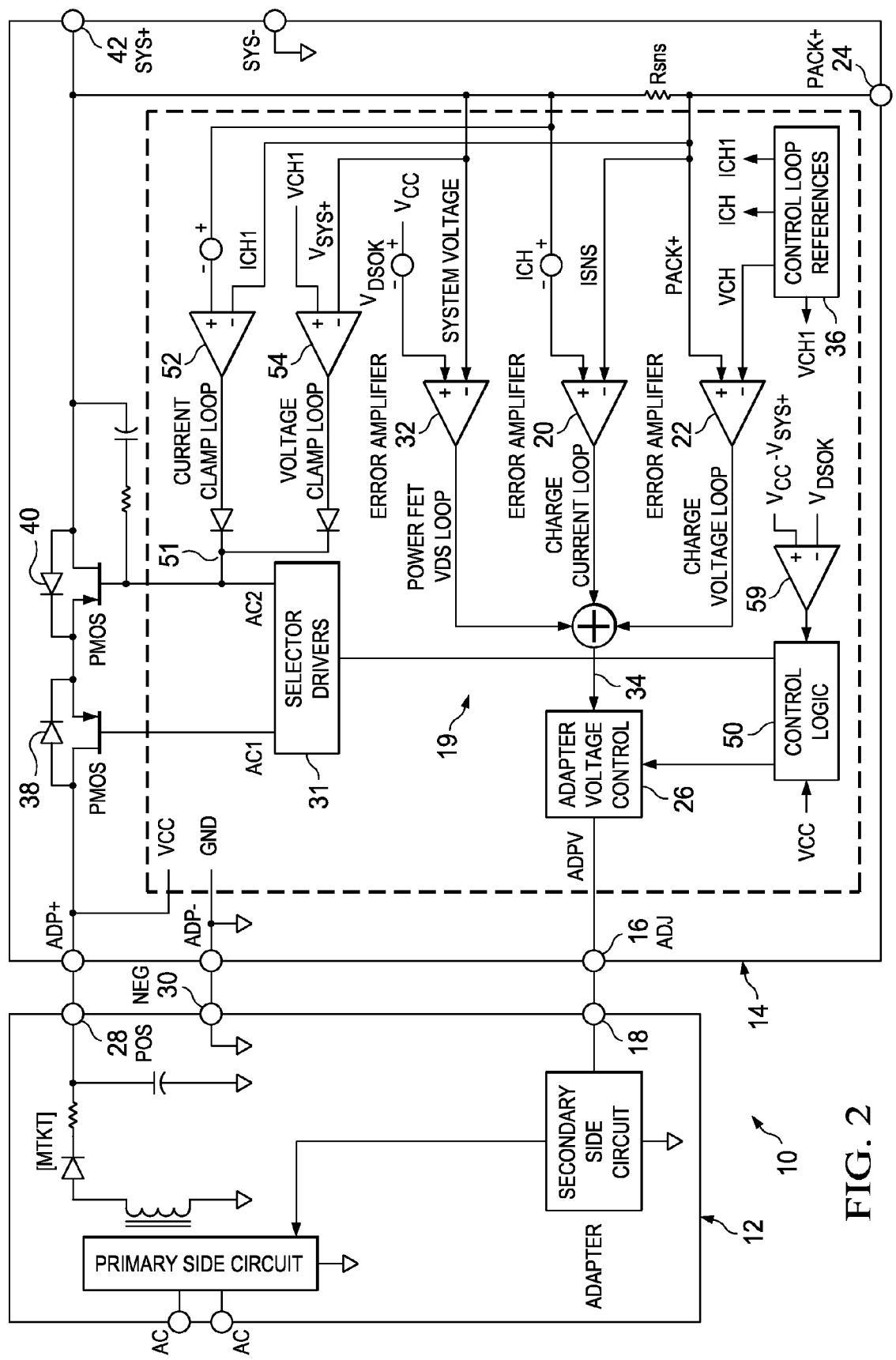
FIG. 2 is a detailed circuit diagram of an alternate system for charging a battery in accordance with an aspect of the present invention.

FIG. 2 depicts an alternate system for charging a battery in accordance with an aspect of the present invention. An AC adapter 12 is controlled by a control system 14 in a closed loop configuration. The control system 14 sends a control signal to the adapter 12 at nodes 16 and 18 respectively. The control system 14 comprises an inner control loop 51 and an outer control loop 19. The outer control loop 19 comprises a charge current control loop 20, charge voltage control loop 22, and an adapter and system differential voltage control loop 32. The charge current control loop 20 and the charge voltage control loop 22 are configured to monitor the charging of the battery pack 24 in order to permit the adapter voltage control 26 to reduce the adapter voltage (POS 28, NEG 30) when selected charge current and charge voltage levels are exceeded. The charge current for the battery pack 24 is measured as a differential voltage across the sense resistor (Rsns) and compared with an internal threshold (ICH) at the charge current control loop 20. The charge voltage is measured at terminal 24 and compared with the internal threshold (VCH) at the charge voltage control loop 22. The adapter to system differential voltage control loop 32 is used to reduce the adapter voltage 28, 30 to be close to the battery voltage when the power MOSFET switches 38, 40 are set to off by the control logic 50. A comparator 59 coupled to the control logic 50 monitors the power (Vcc) to system voltage (Vsys+) differential and causes the MOSFET switch 38 and/or 40 to be off if the power to system voltage differential exceeds an internal threshold VDSOK.

The control loop 32 is coupled to the adapter voltage control 26 and causes the adapter voltage control 26 to reduce the adapter voltage, when the difference between the adapter voltage 28, 30 and the system voltage is greater than a programmed voltage level. In particular, the control loop 32 comprises an error amplifier in which the adapter voltage 28, 30 and the system voltage are inputed. The error amplifier outputs an error signal to cause the adapter voltage control 26 to reduce the AC adapter output when the difference between the adapter voltage and the voltage at the system power bus exceeds the programmed voltage level. In addition to control loops 20, 22, and 32, other control loops for monitoring system or battery parameters other than the battery charge voltage or battery charge current may be added to the control system 14. The distinct error signals from the control loops, 20, 22, and 32, are preferably added, as shown at node 34, and converted to a control signal for output at node 16 by the adapter voltage control 26. The control signal at node 16 sent to the adapter 12 (at node 18) may be in the form of an analog current or analog voltage. Alternatively, the error signal at node 16 may be converted to a digital signal at adapter voltage control 26 and output in digital form at output 16 to control the AC adapter voltage 28, 30. The adapter voltage 28, 30 is preferably controlled by a dedicated input 18 in the adapter 12. Preferably, the maximum charge current, acceptable charge voltage level limits, and other references required by the multiple control loops implemented in the control system 14 may be preprogrammed in the control loop references 36 according to application requirements. The adapter voltage 28, 30 is preferably set higher than the battery pack 24 voltage by the amount required to achieve regulation, overcoming any voltage drops present in the path from the adapter 12 to the battery pack 24.

Power MOSFET switches 38, 40, can be added to isolate the adapter output voltage at node 28 from the system power bus 42. In normal operation, the MOSFET switches 38, 40 are turned on, and will add an ohmic impedance between AC adapter power node 28 and system bus power 42. Under fault conditions or just after the adapter is connected to the control system, the control logic 50 turns off the MOSFET switches 38, 40, to avoid damage to the end equipment due to excessive power dissipation in MOSFET switches 38, 40. It should be appreciated that in steady state operation the AC adapter voltage 28, 30 is maintained above the battery pack voltage 24 by an amount defined by the ohmic impedances of the MOSFET switches 38, 40 and overall system load and charge currents. The closed loop configuration ensures that the AC adapter output voltage 28, 30 will be set to the lowest value required to supply the system load at node 42 and the battery charge current at node 24, thus decreasing the power dissipation in the control system 14.

An inner protection control loop 51, located on the end equipment, is used to protect the system until the outer control loop 19 for the AC adapter 12 reaches the desired operating point. In particular, the inner loop 51 includes a current clamp loop 52 that prevents charge over-current at the battery pack 24, and a voltage clamp loop 54 that prevents charge over-voltage at the system power bus 42. Specifically, the inner loop is connected to the gate of the MOSFET switch 40 and controls the resistance (Rdson) of the AC adapter to the MOSFET switch 40 by overriding the switch gate drive circuit to prevent undesired charge over-current or charge over-voltage. The inner loop 51 can alternatively be coupled to MOSFET switch 38 or the selector drivers 31.

For the current clamp loop 52, the charge current is sensed as a differential voltage across Rsns. If the sensed differential voltage is greater than a charge current reference voltage (ICH1) programmed in the system, the current clamp loop 52 increases Rdson to a predetermined value based on the charge current. The charge current reference voltage ICH1 is set at a value higher than the charger current reference voltage (ICH) for the charge current loop 20, so that the adapter voltage 28, 30 will always be set to the lower value required to adequately charge the battery pack 24 and supply the system load. Preferably, the difference between ICH1 and ICH is ten percent of ICH. As an example of the system operation, assume ICH1 is set to a value that yields a charge current of 2.2 amps and ICH is set to a value that yields a charge current of 2 amps. When a load transient at the system power bus 42 causes the charge current to increase above 2.2 amps, the fast current clamp loop 52 increases Rdson to the appropriate value to protect the system. The outer control loops 20, 22, and 32 continue to reduce the adapter voltage, which in turn reduces the charge current, though, at a slower rate than the current clamp loop 52. The current clamp loop 52 reduces Rdson to a minimum value when the charge current reaches 2.2 amps. When the charge current decreases below 2.2 amps, the inner loop 51 turns off and the MOSFETS 38, 40 turn fully on. The outer control loops 20, 22, 32 continue to reduce the adapter voltage until it reaches the steady state, which corresponds to the reduction of charge current to 2 amps.

The voltage clamp loop 54 increases Rdson of power MOSFET 40, if the system bus voltage is greater than a voltage reference value programmed in the system, VCH1. In particular, when a load transient at the system power bus 42 causes the system bus voltage to increase above the voltage reference value, the voltage clamp loop 54 increases Rdson to the appropriate value to protect the system. When the system bus voltage decreases below the voltage reference value, the inner loop 51 turns off and the MOSFETS 38, 40 turn fully on. The outer control loops 20, 22, 32 continue to reduce the adapter voltage until it reaches the steady state. The voltage clamp loop 54 includes an operational amplifier that outputs an error signal to activate the protection circuit to protect the system, when the system bus voltage increases above the voltage reference value. Both the current clamp loop 52 and the voltage clamp loop 54 comprise operational amplifiers to protect the system, however, other suitable devices can be used instead of the amplifiers.

Figure 3:
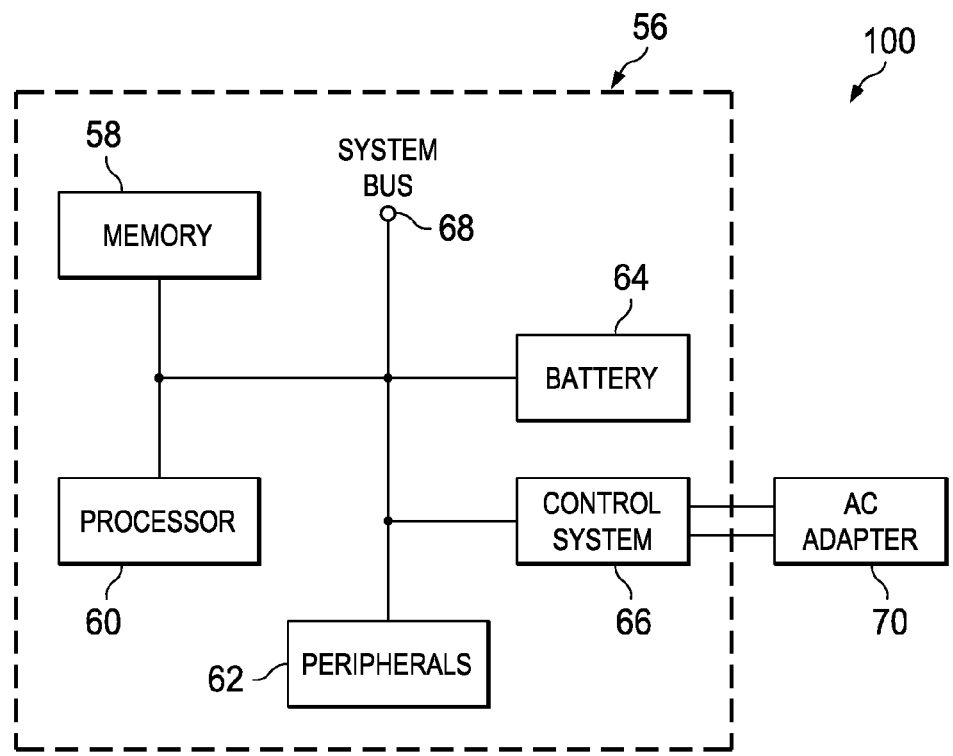
FIG. 3 is a block diagram showing the present invention being used in a portable electronic device.

FIG. 3 illustrates a battery charging system 100 according to an aspect of the present invention being implemented in a portable electronic device 56. The portable electronic device 56 can be any suitable device that is battery operated such as, for example, cell phones and laptop computers. In particular, the portable electronic device is powered by a battery 64 and includes memory 58 for storing data and a processor 60 for processing data powered over a system power bus 68. The portable electronic 56 device may include peripherals 62 such as, for example, a keyboard and a mouse controller, if the portable electronic device 56 is a laptop computer. The battery 64 is charged by an AC adapter 70. The portable electronic device 56 further includes a control system 66 that controls the adapter output voltage and protects the battery 64 during charging based on the monitored parameters of the battery and system. The control system can include a first control loop and a second control loop. The first control loop dynamically adjusts the AC adapter output to the battery 64 in response to at least one first parameter of the system exceeding an associated predetermined threshold. The second control loop includes a protection circuit that activates to protect the system when at least one second parameter of the system exceeds an associated predetermined threshold, until the AC adapter output reaches a predetermined value. The type of parameters include, but are not limited to, the charging current of the battery, the battery voltage, the adapter current, the adapter voltage, and the voltage at the system power bus 68. The associated threshold corresponding to the at least one second parameter is set higher than the associated threshold corresponding to the at least one first parameter, if the at least one first parameter and the at least one second parameter are of the same type such as, for example, both parameters being the battery charging current. The associated threshold corresponding to the at least one second parameter is set higher than the associated threshold corresponding to the at least one first parameter so that the adapter voltage will always be set to the lower value required to adequately charge the battery pack 64 and supply the system load.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system that controls an AC adapter output of an AC adapter for charging a battery and providing power to a system power bus, the system comprising:

a first closed control loop that includes a first monitoring circuit that monitors at least one first parameter associated with charging of the battery and/or powering the system power bus and a control circuit that transmits a control signal to the AC adapter to cause adjustment to the AC adapter output in response to the at least one parameter exceeding an associated first predetermined threshold; and a second closed control loop that includes a second monitoring circuit that monitors transients associated with at least one second parameter associated with charging of the battery and/or powering the system power bus and controls a resistance of a protection circuit between the AC adapter output and the battery and/or system power bus to regulate the second parameter in response to the at least second parameter exceeding an associated second predetermined threshold to protect the battery and/or system power bus, until the first closed control loop adjusts the AC adapter output to a predetermined value.

2. The system according to claim 1, wherein the at least one first parameter and the at least second parameter both comprise at least one of charging current of the battery, the battery voltage, the AC adapter output current, the AC adapter output voltage, the voltage at the system power bus and a difference between the AC adapter output and the voltage at the system power bus.

3. The system according to claim 1, wherein the second predetermined threshold is set to be higher than the first predetermined threshold if the first and second parameters are of the same type.

4. The system according to claim 3, wherein predetermined value is the second predetermined threshold.

5. The system according to claim 1, wherein the second monitoring circuit includes an operational amplifier that outputs an error signal that increases the resistance of the protection circuit when the charging current of the battery exceeds an associated second predetermined threshold and wherein the first closed control loop includes an operational amplifier that outputs an error signal to the controller that transmits a control signal to the AC adapter to adjust the AC adapter output to the predetermined value when the charging current of the battery exceeds an associated first predetermined threshold.

6. The system according to claim 1, wherein the second monitoring circuit includes a first operational amplifier that outputs an error signal that increases the resistance of the protection circuit when the voltage at the system power bus exceeds an associated second predetermined threshold and a second operational amplifier that outputs an error signal that increases the resistance of the protection circuit when the charging current of the battery exceeds an associated second predetermined threshold.

7. The system according to claim 6, wherein the protection circuit is a power MOSFET and outputs of the first and second operation amplifiers are both coupled to a gate of the power MOSFET and the resistance of the power MOSFET is based on the value of one of the error signals.

8. The system according to claim 6, wherein the second monitoring circuit includes a third operational amplifier that outputs an error signal that turns off the protection circuit when the difference between the AC adapter output and the voltage at the system power bus voltage exceeds an associated second predetermined threshold.

9. The system according to claim 1, wherein the first monitoring circuit comprises;
a first operational amplifier that outputs a first error signal based on a difference between a charging current of the battery and an associated first predetermined threshold;
a second operational amplifier that outputs a second error signal based on a difference between a battery voltage and an associated first predetermined threshold;
a third operational amplifier that outputs a third error signal based on a difference between a voltage at the system power bus and an associated first predetermined threshold; and
a summer that provides a total error signal to the control circuit based on a sum of the first, second and third error signals.

10. A portable electronic device comprising the system according to claim 1.

11. A portable electronic device having a battery, the portable electronic device adapted to have the battery charged by an AC adapter output of and AC adapter, the portable electronic device comprising:
a system power bus coupled to the AC adapter output and the battery through a resistive element;
a first closed control loop that includes a first monitoring circuit that monitors at least one first parameter associated with charging of the battery and/or powering the system power bus and provides an error signal to a control circuit that transmits a control signal to the AC adapter to cause adjustment to the AC adapter output in response to the at least one parameter exceeding an associated first predetermined threshold; and
a second closed control loop that includes a second monitoring circuit that monitors transients associated with at least one second parameter associated with charging of the battery and/or powering the system power bus and generates an error signal that controls a resistance of the resistive device between the AC adapter output and the battery and/or system power bus to regulate the second parameter in response to the at least one second parameter exceeding an associated second predetermined threshold to protect the battery and/or system power bus, until the first closed control loop adjusts the AC adapter output to a predetermined value.

12. The portable electronic device according to claim 11, wherein the second predetermined threshold is set to be higher than the first predetermined threshold if the first and second parameters are of the same type and wherein the predetermined value is the second predetermined threshold.

13. The portable electronic device according to claim 11, wherein the second monitoring circuit includes an operational amplifier that outputs an error signal that increases the resistance of the protection circuit when the charging current of the battery exceeds an associated second predetermined threshold and wherein the first closed control loop includes an operational amplifier that outputs an error signal to the controller that transmits a control signal to the AC adapter to adjust the AC adapter output to the predetermined value when the charging current of the battery exceeds an associated first predetermined threshold.

14. The portable electronic device according to claim 11, wherein the second monitoring circuit comprises:
a first operational amplifier that outputs an error signal that increases the resistance of the resistive element when the voltage at the system power bus exceeds an associated second predetermined threshold;
a second operational amplifier that outputs an error signal that increases the resistance of the resistive element when the charging current of the battery exceeds an associated second predetermined threshold; and
a third operational amplifier that outputs an error signal that turns off the resistive when the difference between the AC adapter output and the voltage at the system power bus voltage exceeds an associated second predetermined threshold.

15. The portable electronic device according to claim 11, wherein the first monitoring circuit comprises;
a first operational amplifier that outputs a first error signal based on a difference between a charging current of the battery and an associated first predetermined threshold;
a second operational amplifier that outputs a second error signal based on a difference between a battery voltage and an associated first predetermined threshold;
a third operational amplifier that outputs a third error signal based on a difference between a voltage at the system power bus and an associated first predetermined threshold; and
a summer that provides a total error signal to the control circuit based on a sum of the first, second and third error signals.

16. The portable electronic device according to claim 11, further comprising memory for storing data and a processor for processing data both powered over the system power bus.

17. A system for charging a battery with an AC adapter, the system including a system power bus operatively connected to the AC adapter, the system comprising:
- a first monitoring means for monitoring a parameter associated with charging of the battery and/or powering of the system power bus;
- a control means for dynamically adjusting AC adapter output when the parameter monitored by the first monitoring means exceeds an associated first predetermined threshold;
- a second monitoring means for monitoring transients of the parameter associated with charging of the battery and/or powering of the system power bus; and
- protection means responsive to the second monitoring means when the parameter monitored by the second monitoring means exceeds a second predetermined threshold, wherein the protection means activates to protect the battery and/or system power bus, by controlling a resistance between the AC adapter and the battery to regulate the parameter monitored by the second monitoring means until the first monitoring means and the control means adjust the AC adapter output to the second predetermined threshold.

18. The system according to claim 17, wherein the activation of the protection means comprises increasing resistance of a resistive element connected between the AC adapter and system power bus and battery.

19. The system according to claim 17, wherein the parameter is battery charge current.

20. The system according to claim 17, wherein the parameter is a difference between the adapter voltage and voltage at the system power bus.

* * * * *